United States Patent [19]

Kuhlenschmidt

[11] 4,137,727
[45] Feb. 6, 1979

[54] ABSORPTION REFRIGERATION SYSTEM WITH PRECOOLER AND INERT GAS CONTROL

[75] Inventor: Donald Kuhlenschmidt, Evansville, Ind.

[73] Assignee: Arkla Industries, Inc., Evansville, Ind.

[21] Appl. No.: 799,781

[22] Filed: May 23, 1977

[51] Int. Cl.² ............................................. F25B 15/10
[52] U.S. Cl. ..................................................... 62/490
[58] Field of Search ............... 62/490, 491, 492, 493, 62/494

[56] References Cited

U.S. PATENT DOCUMENTS

| | | | |
|---|---|---|---|
| 2,999,368 | 9/1961 | Schomburg | 62/490 |
| 3,063,257 | 11/1962 | Phillips et al. | 62/490 |
| 3,874,193 | 4/1975 | Reistad | 62/490 |
| 4,051,694 | 10/1977 | Enger | 62/490 |

Primary Examiner—Lloyd L. King
Attorney, Agent, or Firm—Cushman, Darby & Cushman

[57] ABSTRACT

In an absorption refrigeration system of the kind having an inert, non-condensible pressure-equalizing gas the flow of the gas is controlled by providing a flow restriction in the connection which conveys the stream of inert gas from the absorber to the inlet end of a refrigerant liquid precooler. The flow restriction also diverts part of the gas flow into the low-temperature evaporator.

6 Claims, 3 Drawing Figures

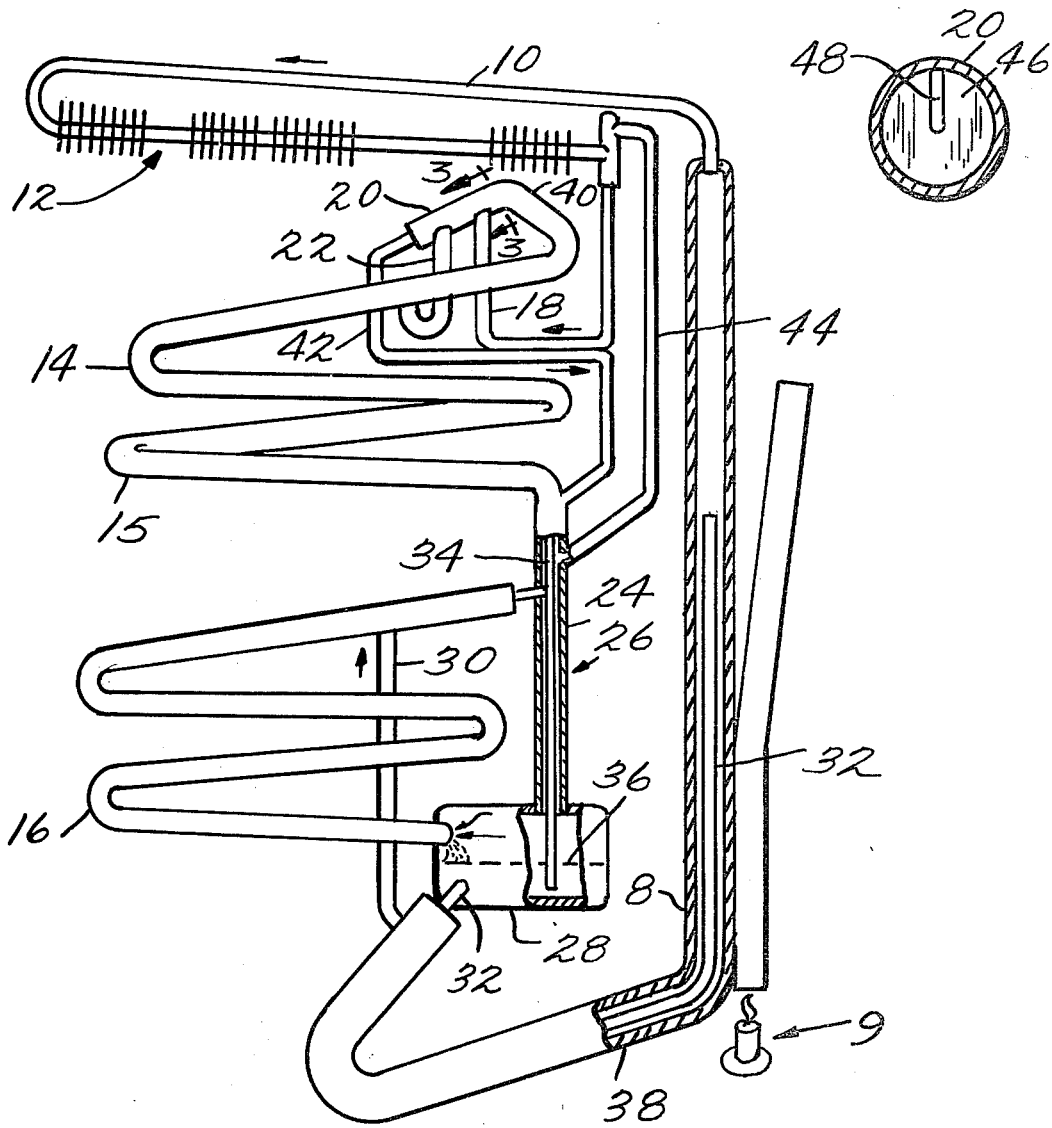
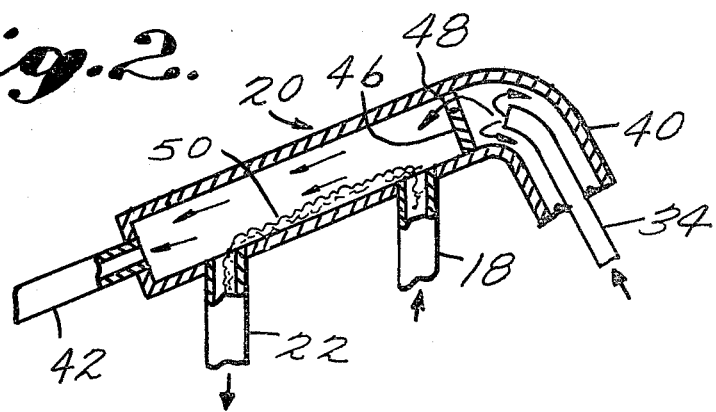

ABSORPTION REFRIGERATION SYSTEM WITH PRECOOLER AND INERT GAS CONTROL

This invention relates to absorption refrigeration systems wherein a non-condensible component in the form of a gaseous pressure equalizing medium aids in condensation of the refrigerant and wherein liquid refrigerant is precooled after leaving the condenser and before entering the evaporator. More in particular the invention relates to the control of the flow of the non-condensible component in such systems.

BACKGROUND AND SUMMARY OF THE INVENTION

It is known in the absorption refrigeration art relating to systems wherein evaporation of liquid refrigerant takes place in the presence of a non-condensible inert gas that a lower evaporator temperature can be effected by precooling the liquid refrigerant before it passes to the main or low temperature evaporator. As an example, U.S. Pat. No. 2,167,697 describes a system in which the refrigerant is ammonia, the absorption liquid is water and the non-condensible inert gas is hydrogen. The hydrogen flows from the absorber and is divided into two streams. One stream after being cooled flows to the main or low temperature evaporator where it passes in direct contact with liquid ammonia which is vaporizing. From the evaporator the mixture of ammonia gas and hydrogen returns to the absorber. The other stream of hydrogen after being cooled flows to a precooler where it passes in direct contact with warm liquid ammonia from the condenser. Since the partial vapor pressure of ammonia in the gas mixture in the precooler is less than the vapor pressure of the warm liquid ammonia entering the precooler from the condenser some of the liquid ammonia evaporates and diffuses into the gas mixture with the result that heat is removed from the liquid ammonia. The gas mixture then returns to the absorber. The precooling of the liquid ammonia provides a lower temperature in the evaporator and effects other advantages discussed in the patent.

A subsequent U.S. Pat. No. 3,464,221, describes a refrigeration system embodying the above-summarized concepts and including modifications which control the hydrogen flow in the system. In one embodiment described in this patent the conduit which passes the mixture of hydrogen and ammonia gas from the precooler back to the absorber includes a portion of reduced cross-section which produces a flow restriction, i.e. control of inert gas is effected after the gas leaves the precooler. In another embodiment described in this patent the conduit which conducts liquid refrigerant from the condenser to the precooler is flattened along a portion of its length to avoid undesirable circulation of hydrogen over the free liquid level in this conduit.

The present invention provides an absorption refrigeration system of the above type having an improved form of inert gas control. In this system control of the inert gas is effected before the gas enters the precooler in that the inert gas stream from the absorber is acted on by a flow restriction located between the low temperature evaporator and the non-condensible gas inlet of the precooler. Preferably the flow restriction is a slotted orifice which passes a portion of the gas into the cooler and which directs the remainder into the low temperature evaporator.

The invention will be further understood from the following more detailed description of an examplary embodiment taken with the drawing in which:

FIG. 1 is a schematic elevational view of an absorption refrigeration system embodying the principles of the present invention;

FIG. 2 is a fragmentary view showing the precooler of FIG. 1; and

FIG. 3 is a sectional view on an enlarged scale taken on the line 3—3 of FIG. 1.

The refrigeration system shown in the drawing includes a refrigerant vapor generator 8, a refrigerant condenser 12, a low temperature evaporator 14 and an absorber 16. For purposes of illustration the refrigerant may be considered as ammonia, the absorbent as water and the inert non-condensible gas as hydrogen. Refrigerant vapor is liberated from a strong solution of refrigerant in absorbent by heat applied to the generator 8, as by a gas burner 9 and passes through a conduit 10 to the condenser 12 where it is cooled and condensed to warm liquid form. The warm liquid refrigerant passes from the condenser 12 through a conduit 18 to a precooler 20 which is described in detail hereinafter. From the precooler 20 cold liquid refrigerant flows through a conduit 22 to the low temperature evaporator 14 which in a typical household refrigerator is employed to cool a food freezing compartment. From the low temperature evaporator 14 the refrigerant in mixture with the inert gas flows through the high temperature evaporator 15 to the outer conduit 24 of a heat exchanger 26 to a leveling tank 28 and then into the lower end of the absorber 16.

In the absorber 16 the gas mixture contacts a downwardly flowing stream of weak absorbent which enters the upper portion of the absorber 16 by way of a conduit 30. The refrigerant vapor is absorbed into the weak absorbent to form strong absorbent which flows from the lower end of the absorber 16 into the tank 28 and then through a conduit 32 to the generator 8. Inert gas weak in refrigerant vapor flows out of the upper end of the absorber 16 into a conduit 34 which extends through the evaporator tube 14. The lower end of the conduit 34 is open at a location below the solution level 36 in the tank 28.

Hot weak absorbent produced in the generator 8 by the driving off of refrigerant vapor from the strong absorbent passes from the lower end of the generator 8 into a conduit 38 or pump tube. The conduit 38 surrounds the strong absorbent conduit 32 so that heat is transferred to the strong absorbent before the latter reaches the generator 8. The refrigerant vapor passes upwardly into the conduit 10 and then to the condenser 12 to repeat the refrigeration cycle.

The precooler 20 comprises a short inclined tube communicating at its upper end with a conduit 40 which is part of the upper end of the evaporator tube 14. The lower end of the precooler 20 communicates with an enriched inert gas conduit 42 which connects with the refrigerant vapor conduit 24 leading from the lower end of the evaporator tube 14 to the tank 28. The warm condensed refrigerant conduit 18 from the condenser 12 connects with the precooler 20 at a location on the undersurface of the latter's upper end, and the precooled liquid refrigerant conduit 22 extends from a location on the undersurface of the precooler's lower end to the evaporator tube 14. A U-section in the conduit 22 remains full of liquid refrigerant and thereby prevents passage of inert gas through the conduit 22.

The conduits 18 and 42 pass in heat exchange relationship with each other so as to form a liquid-gas heat exchanger in which heat is transferred from liquid refrigerant to the mixture of inert gas and refrigerant vapor. A pressure equilization tube 44 extends between the lower end of the condenser 12 and the conduit 24.

In accordance with the principles of the present invention control over the flow of inert gas in the system is effected by a flow restriction placed between the interior of the precooler 20 and the upstream end of the conduit 34 which conveys inert gas from the absorber 16 to the precooler 20. That is, the restriction is located in the upper end of the low temperature evaporator 14, 40. In its preferred form the restriction is an orifice which is so sized and located that it passes inert gas into the precooler 20 while preventing absorber-refrigerant solution from clogging the orifice by capillary action. The preferred orifice construction is a disc 46, or its equivalent, disposed in the internal cross-section of the upper end of the precooler 20 and provided with a narrow vertical slot 48 in its upper edge. The location of the slot 48 in this position avoids to a large extent contact with any refrigerant solution which might be formed in small amounts by condensation. The width of the slot 48 is as small as possible yet sufficiently large that refrigerant solution will not creep into it by capillary action and thereby restrict the flow of inert gas. The length of the slot 48 is determined by the amount of flow required to cool the warm refrigerant passing through the precooler.

The disc 46 also serves to divert part of the inert gas flowing from the conduit 34. As shown by the arrows in FIG. 2 that portion of the inert gas which does not flow through the slot 48 flows into the conduit 40 and thence to the low temperature evaporator tube 14.

A summary of the operation is as follows: Weak inert gas (i.e. weak in refrigerant content) flows from the open upper end of the conduit 34. A portion of the gas flows through the orifice slot 48 to the precooler while the remainder flows to the low temperature evaporator 14. The liquid refrigerant conduit 18 conveys condensed refrigerant from the condenser 12 in heat exchange relationship with the conduit 42 and to the precooler 20. As the liquid refrigerant, illustrated at 50 in FIG. 2, flows down the inner wall of the precooler 20 in the presence of the co-currently moving inert gas, evaporation of the liquid refrigerant takes place reducing the temperature of the remaining liquid refrigerant. Thus cold liquid refrigerant is now introduced to the low temperature evaporator 14 through the conduit 22. Enriched inert gas (i.e. enriched with refrigerant vapor) leaves the precooler 20 through the conduit 42 and exchanges heat with the conduit 18. The resulting warm enriched inert gas returns to the conduit 24.

What is claimed is:

1. In an absorption refrigeration system of the kind including a low-temperature evaporator vessel wherein relatively cold liquid refrigerant evaporates in the presence of a first stream of non-condensible pressure equalizing gas, a liquid refrigerant precooler wherein relatively warm liquid refrigerant is cooled by partial evaporation into a second stream of the non-condensible gas, means conveying relatively cold liquid refrigerant from the precooler to the low-temperature evaporator, an absorber vessel wherein refrigerant vapor is absorbed from the gaseous mixture from the low temperature evaporator thereby effecting a supply stream of non-condensible gas and means for splitting the supply stream of non-condensible gas into said first and second streams the improvement which comprises flow restricting means having an orifice through which said second gas stream passes before entering said precooler, the shape and size of said orifice being such that any refrigerant-absorbent solution which is present will not creep into said orifice and thereby restrict flow of gas therethrough.

2. Apparatus as in claim 1 wherein said flow restricting means is a wall having a narrow elongated slot therein.

3. Apparatus as in claim 1 wherein said precooler comprises an inclined vessel having a gas mixture outlet at its lower end and having a connection between its upper end and said low temperature evaporator, said flow restriction means being located in said connection, said apparatus further including a conduit for conveying said supply stream of non-condensible gas to said connection at a location on the low-temperature side of said flow restriction means.

4. In an absorption refrigeration system a condenser for condensing refrigerant to relatively warm liquid, a refrigerant precooler for receiving relatively warm liquid from the condenser and for evaporating a portion thereof to provide a stream of relatively cold liquid refrigerant, an evaporator receiving the stream of relatively cold liquid for vaporizing the liquid in the presence of a non-condensible pressure-equalizing gas, an absorber wherein refrigerant vapor is absorbed from the gaseous mixture from the low temperature evaporator thereby effecting a supply stream of non-condensible gas, a conduit conducting the supply stream of non-condensible gas from the absorber, and means placing said conduit in communication with said precooler and with said evaporator at a location near the point of entry of liquid refrigerant into said evaporator, said means including a gas flow restriction which passes a portion of the non-condensible gas into said precooler and which directs the remainder of the non-condensible gas into said evaporator.

5. Apparatus as in claim 4 wherein said non-condensible gas conduit passes through said evaporator and conducts said gas in a direction opposite to the direction of movement of gaseous mixture through said evaporator.

6. Apparatus as in claim 4 wherein said gas flow restriction is a disc having a narrow elongated slot therein, one side of said disc being in communication with the interior of said precooler and the other side of said disc being in communication with said evaporator and with said non-condensible gas conduit.

* * * * *